Jan. 8, 1957 C. M. FIRKINS 2,776,771
BARN CLEANING APPARATUS
Filed May 20, 1950 5 Sheets-Sheet 1
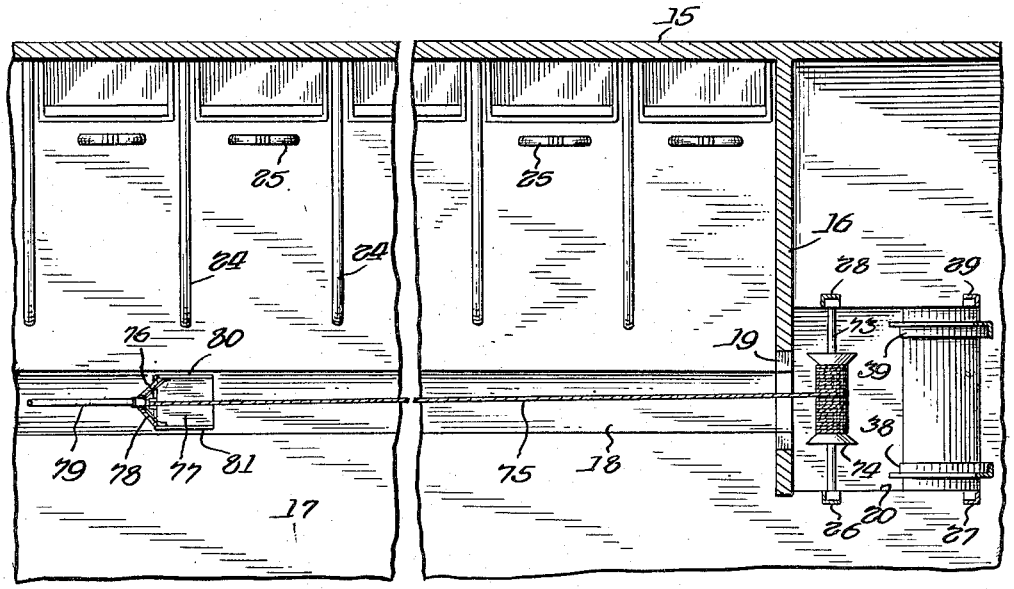
Fig. 1.
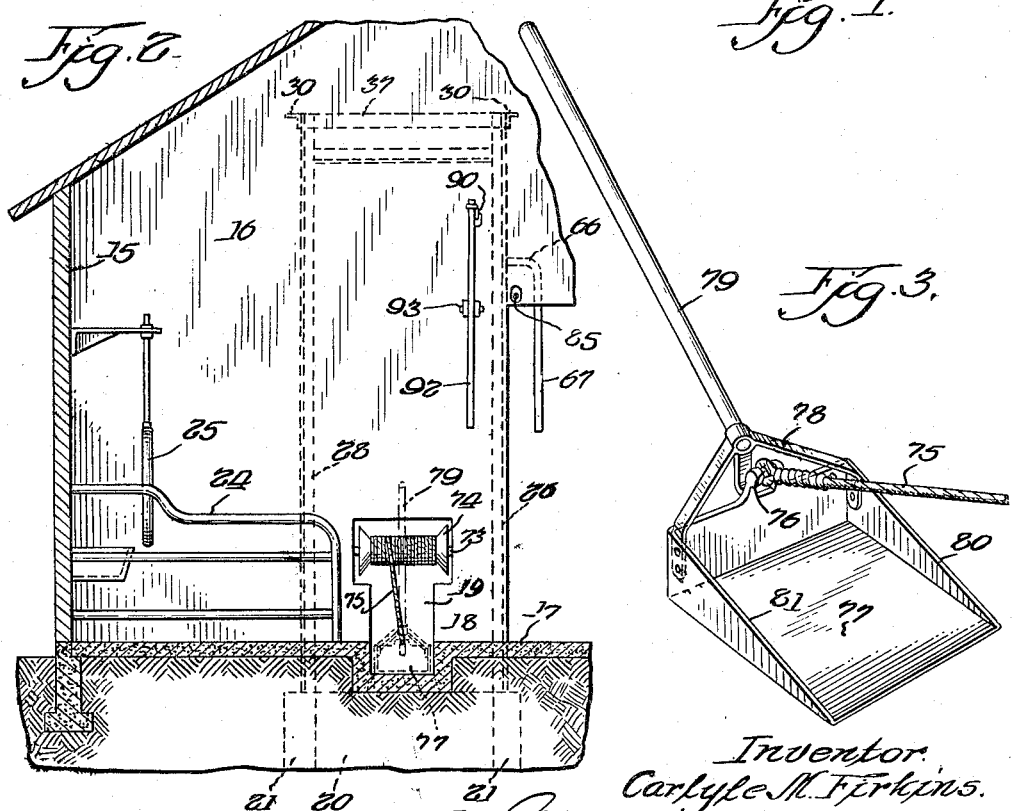
Fig. 2.
Fig. 3.
Inventor.
Carlyle M. Firkins.
By Wilkinson, Huxley, Byron, Hume
Attys.

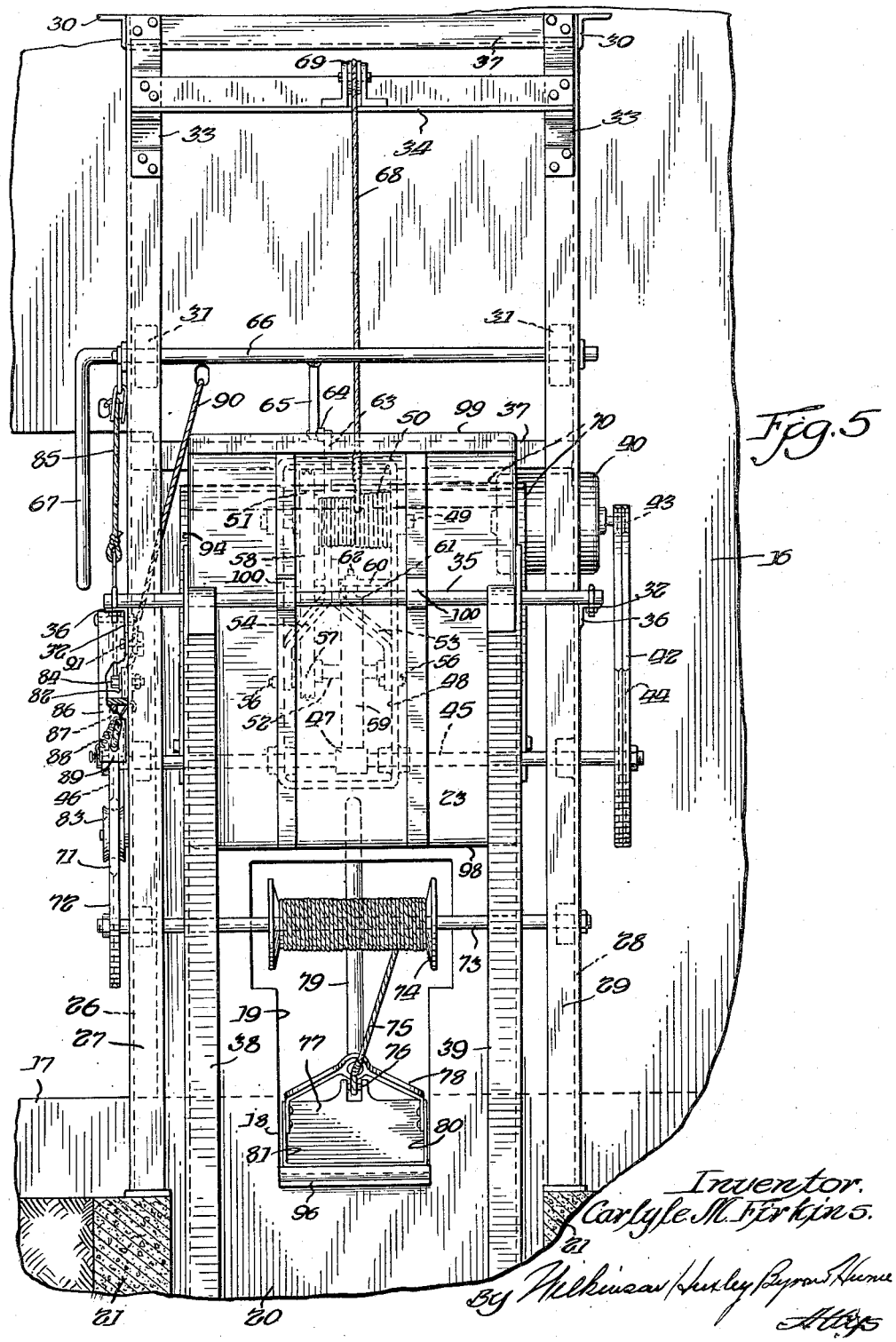

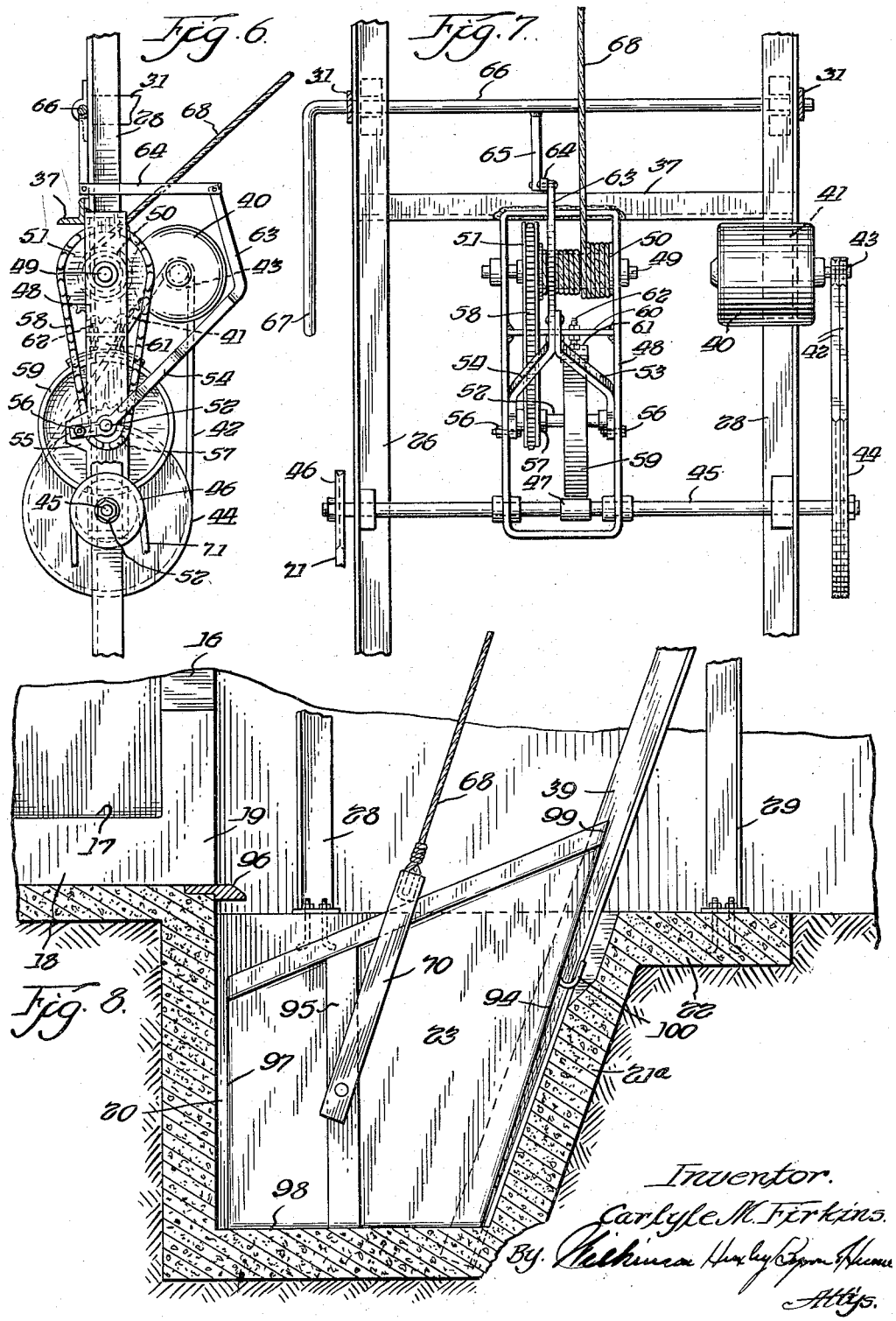

Jan. 8, 1957  C. M. FIRKINS  2,776,771
BARN CLEANING APPARATUS
Filed May 20, 1950  5 Sheets-Sheet 5
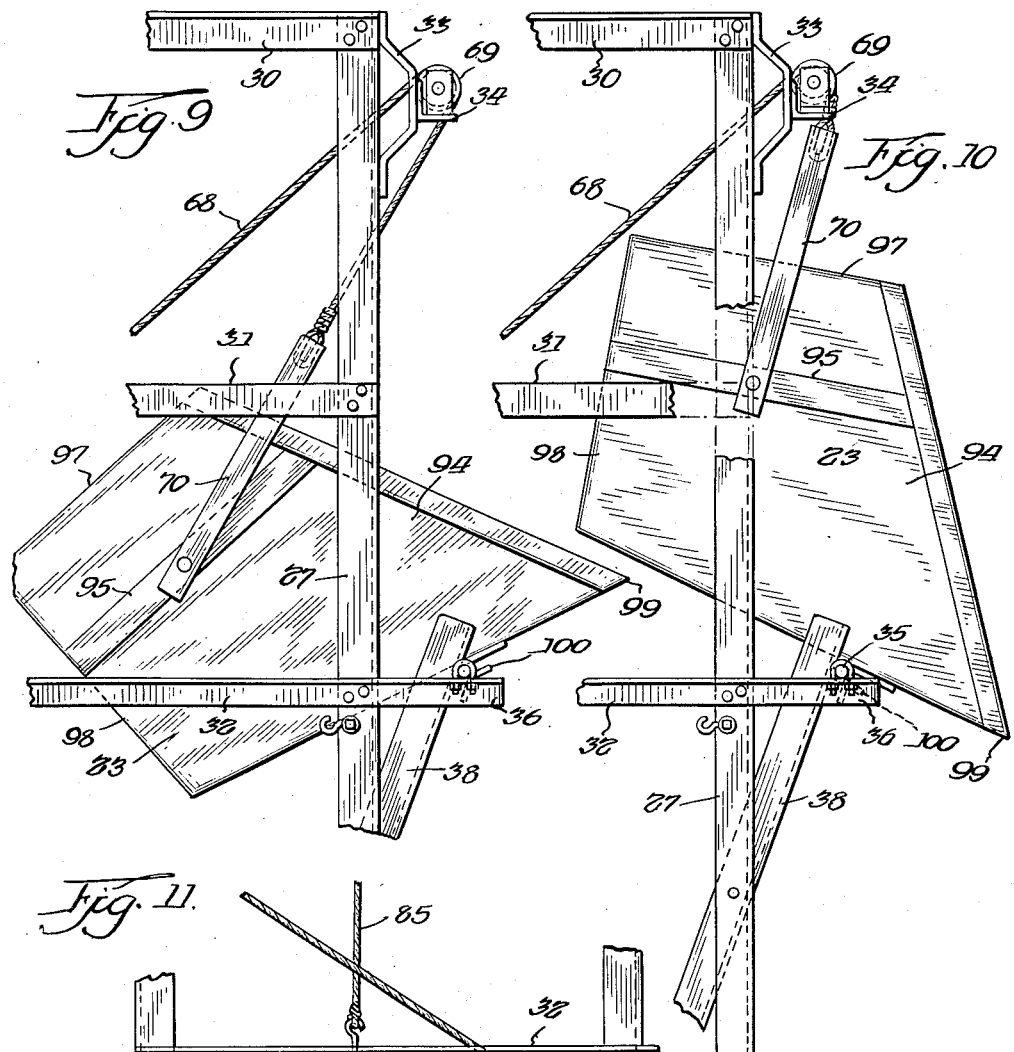
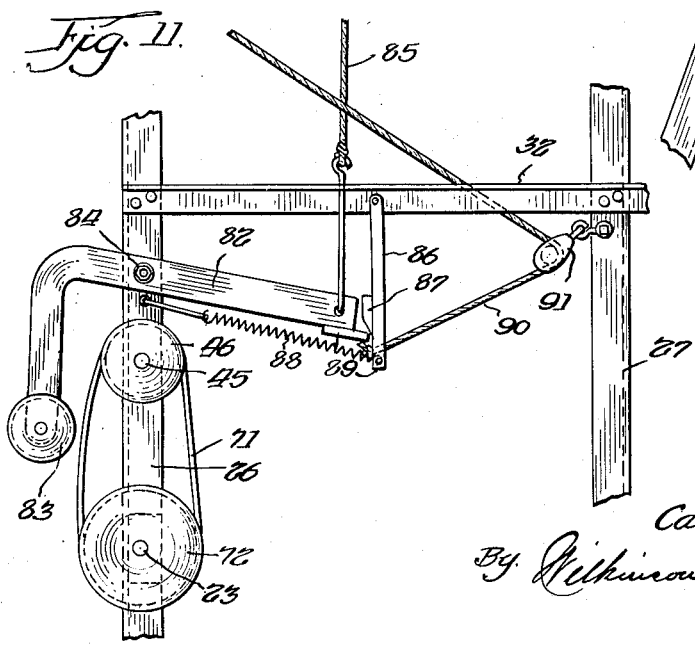
Inventor.
Carlyle M. Firkins.
By Wilkinson, Huxley, Byron & Hume
Attys.

United States Patent Office 2,776,771
Patented Jan. 8, 1957

2,776,771

BARN CLEANING APPARATUS

Carlyle M. Firkins, Genoa, Ill.

Application May 20, 1950, Serial No. 163,236

1 Claim. (Cl. 214—622)

My invention relates to a barn cleaning apparatus and has particular reference to apparatus which is combined particularly with a dairy barn structure which is preferably built into and forms a part of the barn structure but which may be added to dairy barn structures already in existence which possess structural features with which the invention may be used.

The primary object of my invention is the provision of an apparatus which is power operated but with manual supervision of the parts and which is primarily adapted for cleaning a dairy barn having a gutter therein which extends on a right angle to the stalls provided for cattle or other livestock and provides means for cleaning out the manure, bedding, and the like from the gutter formed for receiving the droppings of cattle and depositing it in a vehicle such as a manure spreader which can be positioned alongside of the barn, so that material removed from the barn can be taken from the immediate premises and distributed upon pastures, fields, and the like remote from the dairy barn.

Another and further object of my invention is the provision of a cleaning apparatus by means of which all bedding, such as straw, manure, liquid, and the like which may collect in the gutter is removed and which is capable of performing this operation with a degree of thoroughness to satisfy the rather rigid requirements of the health and dairy authorities having to do with the inspection of barns, the utilities for handling milk and the like now common in most municipal areas.

I am aware that various power operated mechanisms have been heretofore devised for performing the function of removal of manure, bedding, liquid, and the like from these barns and which embody various combinations of mechanical continuous traveling conveyors which are ordinarily mounted in the lower section of the gutter and carry the larger portion of the material deposited in the gutter to the end of the gutter where it is placed in carriers for removal from the premises. However, due to the character and nature of the manure and material to be handled, a certain amount of the manure and refuse is carried under the endless conveyor and there deposited where it is inaccessible for removal and a certain quantity of the material adheres to the links of the conveyors, chains, gearing, and the like where horizontal traveling drag chains with paddles attached thereto are used so that the refuse that remains becomes a breeding place for flies, insects, bacteria, and the like to such an extent that such devices are wholly impractical and are not successful in operation and will not enable the dairy man to keep his premises sufficiently clean to satisfy the requirements for the average dairy inspection as far as the cleanliness of his premises is concerned. The result is that most of the work has to be performed manually with wheelbarrows and the like so that the task is a laborious one requiring a great deal of time and so far no one has yet made a successful application of power to perform this operation in a manner sufficiently successful to insure the satisfaction of the requirement for cleanliness in dairy barns. With my improved apparatus I am able to remove all refuse in a very short period of time so that that portion of the work heretofore performed manually such as the removal of the manure and the placing of it in a vehicle for transportation away from the barn is accomplished with power rather than a manual operation and the necessary cleaning for a herd of twenty or twenty-five cows can be performed within a few minutes time and much less effort than what has been possible heretofore.

Another and further object of my invention is the provision of a barn cleaning apparatus in which provision is made for the removal of the heavy portions of manure and the like but in which the liquid is permitted to flow into a watertight receptacle where it is caught and mixed with the other refuse removed from the barn and does not collect in pools or the like nor run into the ground, thus causing odors and bacteria development which is the result of allowing the liquid and the like to flow outside of the barn, which is now a common practice.

Another and further object of my invention is the provision of a barn cleaning apparatus which is comparatively inexpensive to manufacture and also comparatively easy to install and operate as a part of the barn equipment and also which operates with a minimum of power and is easily and quickly controlled for the operations necessary for cleaning the barn used for dairy purposes.

These and other objects of my invention will be more fully and better understood by reference to the accompanying sheets of drawings and in which—

Figure 1 is a schematic plan view of a portion of a barn and cleaning apparatus;

Figure 2 is a schematic vertical sectional view through a portion of a barn and cleaning apparatus;

Figure 3 is a perspective view of the gutter cleaning scoop used in connection with my improved cleaning apparatus;

Figure 5 is an end elevational view of the parts shown in Figure 4;

Figure 6 is a detail side view of the bucket hoisting apparatus;

Figure 7 is a detail elevational view of the parts shown in Figure 6;

Figure 8 is a detail view partially in section and partially in elevation of the bucket pit with the bucket positioned therein;

Figure 9 is a detail elevational view showing the hoisting bucket in partially dumped position;

Figure 10 is a detail elevational view showing the hoisting bucket in fully dumped position; and Figure 11 is a detail elevational view of the drag line control mechanism.

Figure 4:
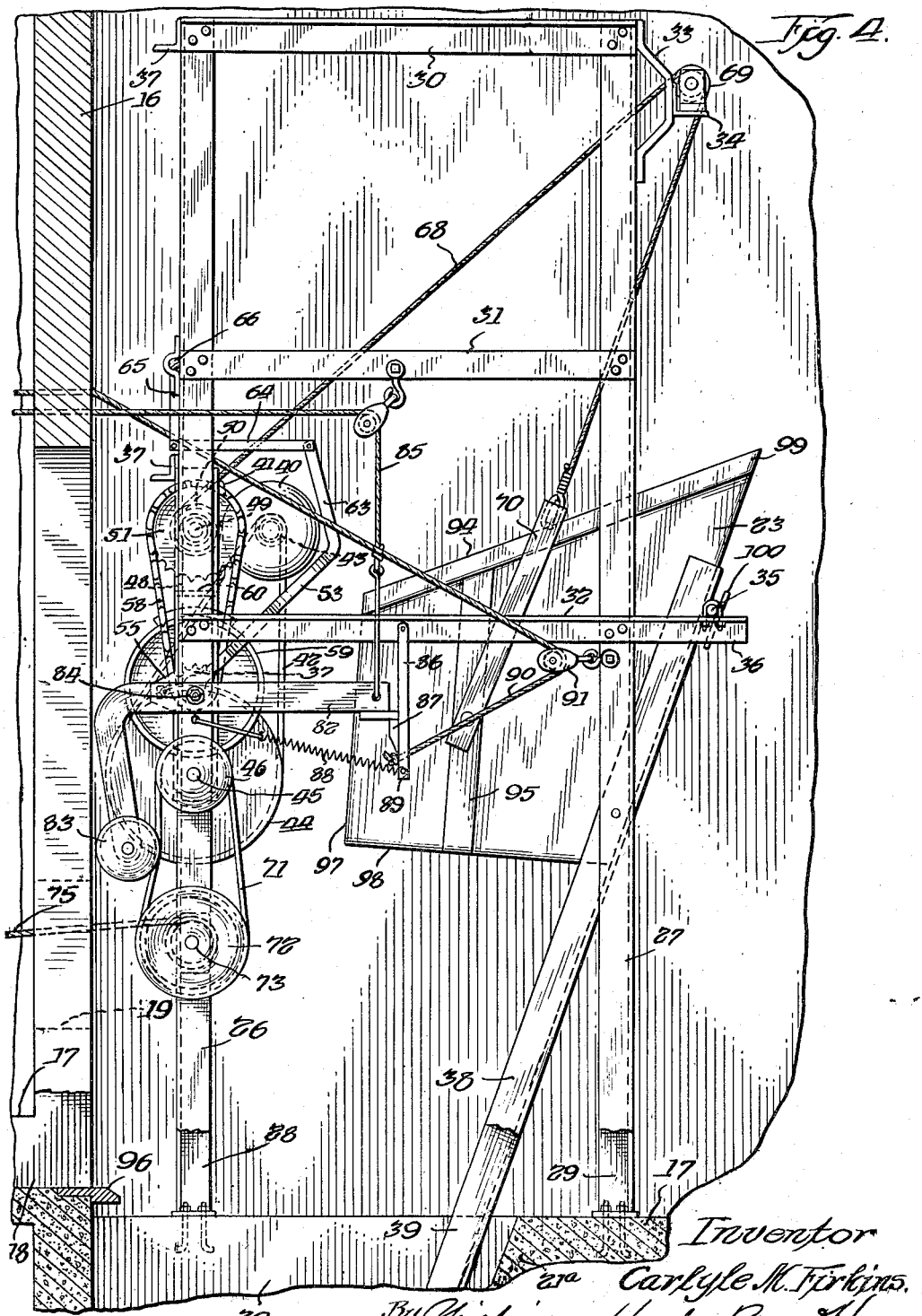
Figure 4 is a side elevational view of the operating frame and power apparatus mounted thereon.

Referring now specifically to the drawings and in which like reference characters refer to like parts throughout, a fragmentary portion of a dairy barn is illustrated and which consists generally of a side wall 15 and an end wall 16 made of concrete or any approved construction, and having a floor 17 preferably of concrete with a gutter 18 formed therein which extends through an opening 19 in the end wall 16 of the barn and discharges into a pit 20 formed in the usual manner with vertical concrete walls 21 and a sloping wall 21a having a lateral extension 22 extending on three sides therefrom, the pit being watertight and of a shape to receive a bucket 23 which is adapted to receive the refuse, manure, and the like which is discharged into and forced from the end of the gutter 18.

Separators 24, 24 are provided which provide stalls with the usual stanchions 25, 25 being mounted in each of the stalls, this being the usual and common construction for barns of this type and character. External of the end wall 16 I provide a rectangular frame consisting of four vertically extending frame members 26, 27, 28 and 29 which are anchored to the floor extension 17 in any suitable manner and have a pair of longitudinal top braces 30, 30 and a pair of intermediate longitudinal braces 31 and 32 connecting the frame members 26 and 27, and the frame members 28 and 29, respectively. Yokes 33, 33 are mounted on the frame members 27 and 29, respectively, adjacent their upper ends to which a cross member 34 is attached at each of its ends and which connects the frame members 27 and 29 at their upper ends. A dump and support shaft 35 is provided which is anchored in any suitable manner as by U-bolts to extensions 36, 36 of the ends of the braces 32, 32 which span the space between the frame members 27 and 29 and 26 and 28 and assists in holding the frame against lateral spreading. Other braces 37, 37 connect the frame members 26 and 28 so that a substantial frame is provided for the support of the power operating parts of the mechanism and which extends above the pit 20.

A pair of inclined tracks 38 and 39 are provided which extend into and are anchored at their lower ends in the concrete forming the bottom of the pit 20 and are supported by and secured to the dump shaft 35 at their upper ends and form guideways along which the bucket 23 moves out of and into the pit 20.

A motor 40 is mounted on the frame member 28 by means of a bracket 41 and has a double belt 42 extending over a belt wheel 43 on the end of the motor shaft, the belt 42 operating over a wheel 44 which is splined to a shaft 45 and journaled in the vertical frame members 26 and 28 with a belt wheel 46 mounted on the end of the shaft 45 opposite to the wheel 44 and having a small friction wheel 47 mounted on the said shaft 45 intermediate its ends. A rectangular frame 48 is provided in the lower end of which the shaft 45 is journaled and at its upper end is attached to the cross brace 37. Journaled in the upper end of the frame 48 is a shaft 49 upon which a winding drum 50 is mounted with a sprocket wheel 51 splined to the shaft 49 and secured to the drum 50 with a shaft 52 being provided which is journaled in a pair of arms 53 and 54, each of said arms being journaled at their ends in extensions 55, 55 of the outer sides of the frame 48 by means of bolts 56, 56 with the arms 53 and 54 being pivotally mounted for a slight rotative movement about the bolts 56, 56. A sprocket wheel 57 is mounted on the shaft 52 and has a sprocket chain 58 extending thereover in engagement with the sprocket wheel 51 secured to the winding drum 50. A friction wheel 59 is splined to the shaft 52 and a cross bracket 60 provided in the frame 48 upon which a fixed brake shoe 61 is mounted by means of bolts 62, 62, which by means of the fixed brake shoe 61 is adjustable with respect to the friction wheel 59. The arm 54 has an extension 63 thereon which is secured to a connecting member 64 which in turn is secured to an arm 65 fixed on a shaft 66 which is journaled in the upright frame members 26 and 28 and which has a handle portion 67 thereon by means of which the operator controls the raising and lowering of the bucket 23. A cable 68 is provided which is secured to the drum 50 at one of its ends and extends over a pulley 69 and is secured to the bail 70 of the bucket 23, so that as the cable is wound upon the drum 50 the bucket is elevated upon the tracks 38 and 39 from its receiving position in the pit 20 and to its discharging position where its lading is discharged into a manure spreader, wagon, or the like placed adjacent the end of the apparatus.

The belt wheel 46 has a belt 71 thereover which extends around a belt wheel 72 mounted on one end of a shaft 73 which is journaled for rotation in the upright posts 26 and 28 and which has a drag line drum 74 mounted thereon around which a cable 75 is wound with the free end of the cable 75 being secured to a fastening bolt 76 which is secured to the rear end of a scoop 77 to which a yoke 78 is secured and to which a handle 79 is attached with the side portions 80 and 81 of the scoop being formed in a triangular shape with the width of the scoop being such that it is only slightly narrower in width than is the gutter 18, so that movement of the scoop along the gutter 18 cleans the bottom of the gutter as well as the sides thereof.

An L-shaped arm 82 is provided on one end of which a tightening pulley 83 is mounted which is normally in engagement with the belt 71, the lever 82 being pivotally mounted by a bolt 84 upon the upright frame member 26, with a rope 85 being secured to the free end of the lever 82 and which normally would extend throughout the length of the barn and be positioned high enough so it is out of the way of the operator and of animals going into the stalls but within the reach of the operator in using the apparatus and can have one of its ends attached to the barn structure or the like where it is supported above the floor of the barn. A swinging lever 86 is provided which has a latch member 87 mounted on the face thereof which has an inclined lower end with a spring 88 being provided which is anchored at one of its ends to the upright member 26 and at its opposite end to the lever 86 with the latch 87 normally in sliding engagement with the end of an extension 89 formed on the end of the lever 82. A rope 90 is secured to the lower end of the lever 86 and extends over the pulley 91 secured to the upright post 27 and extends through the barn wall where it is attached to the upper end of a release lever 92 pivotally mounted at 93 to the inside end wall of the barn so that the swinging lever 86 occupies the position shown in Figure 11 during the normal free operation of the device and in the position shown in Figure 4 when the scoop is being used to clean the gutter 18 as will be described hereinafter.

The bucket 23 has an angularly disposed front wall 94 and is made of sheet metal or the like with vertically extending braces 95, 95 at each of its sides to which the bail 70 is pivotally secured by bolts or the like and to which the cable 68 heretofore described is attached. The front wall 94 of the bucket is angularly disposed with respect to the vertical plane of the bucket 23 and also with respect to the tracks 38 and 39, the said tracks 38 and 39 extending out of the pit 20 at a slightly greater angle than is the side 95 of the bucket for reasons hereinafter given. The gutter 18 at its discharge end has a drain strip 96 mounted therein, the outer edge of which projects outward over the pit 20 within which the bucket 23 is fitted (shown particularly in Figure 8) so that drainage from the gutter is certain to fall within the bucket 23 which normally is made watertight. The rear side 97 of the bucket is formed at a right angle to the bottom 98 of the bucket 23 and perpendicular to the adjacent wall of the pit 20 with the front wall 94 of the bucket 23 being formed considerably longer than the rear wall 97 of the bucket, so that a spout or discharge portion 99 is formed on the bucket 23 with stops or hooks 100, 100 being secured to the side 94 of the bucket and which, as the bucket 23 is being elevated, engages upon the dump rod 35 upon which the bucket 23 pivots and around which it rotates as it is being discharged. Because of the angular position of the front wall 94 of the bucket 23 with respect to the tracks 38 and 39, as the bucket is lowered into the pit it first engages upon its forward bottom edge and then as the cable 68 is slackened off it tilts back until its rear wall 97 is under the member 96, so that the forward wall 94 of the bucket is out of engagement towards its upper end with the tracks 38 and 39. As the bucket is being lifted due to the point of attachment of the bail 70 to the reinforcing members 95 at the side of the bucket 23, the bucket 23 is lifted at its rear portion and tilted forward before it starts upward on the tracks 38 and 39 thereby clearing the drainage member 96, so that the bucket can be freely lowered into and hoisted out of the pit when it is desired to fill the bucket or to discharge its contents.

When it is desired to operate the device the motor is started by closing the circuit running to it from any suitable source of current supply and the shaft 43 and friction wheel 47 are rotated freely along with the belt wheel 46. The operator thereupon grasps the handle 79 of the scoop and drags it along the concrete floor 17 outside of the gutter to a point selected by him in his judgment from the end wall of the barn when the scoop is placed in the gutter with the operator holding the handle, whereupon he pulls downward on the rope 85 which in turn lifts the lever 82 tightening the belt 71 around the pulley 82 and which starts the cable 75 to wind around the drum 74, 74 drawing the scoop toward the discharge end of the gutter 18. As the rope 85 is pulled, the end of the lever 82 to which this rope is attached is elevated, the member 86 is drawn inwards so the latch member 87 engages under the extension 89 on the end of the lever 82 and holds the belt 71 tight enough to rotate the pulley 72 on the shaft 73 and the winding drum 74 with it. As the material gathered by the scoop 77 is discharged into the bucket 23 over the end of the gutter 18, the operator by pushing on the lower end of the lever 92 releases the latch member 87 from under the extension 89 on the end of the arm 82 allowing the belt 71 to slacken off and stopping the operation of the drag line drum 74. Thereupon, if sufficient material is gathered in one operation of the scoop to fill the bucket 23, the operator pushes forward on the lever 67 rotating the shaft 66 and moving the extension 65 in a counter-clockwise direction and exerts a forward thrust on the link 64 forcing the members 53 and 54 downward and bringing the friction wheel 59 into engagement with the friction roller 47 which immediately causes the cable 68 to wind around the drum 50, thereby first tilting the bucket 23 and then lifting the bucket 23 out of the pit 20 where it travels along the tracks 38 and 39 until the hooks 100, 100 engage on the dump shaft 35 when the bucket starts to rotate and continues until it reaches a fully discharged position (as shown particularly in Figure 10) thereby discharging its lading into a spreader, wagon, or the like outside of the frame, the distance of the discharge from the frame allowing for the deposit of the lading into the center of the body of the spreader so the spreader body can be filled without the necessity of moving the material in the spreader body. After the lading from the bucket is discharged, the operator releases the friction mechanism by exerting a pull on the lever 67 whereupon the bucket turns in a counterclockwise position back onto the tracks 38 and 39, the drum travels in the reverse direction from that in the hoisting operations with the operator controlling the speed of travel by a pulling force on the lever 67 which places the friction wheel 59 into engagement with the shoe 61 so that the bucket 23 is lowered back into position in the pit 20.

Thereupon the operator repeats the operation going farther along the gutter and cleaning a new section of it and traveling over the section that was previously cleaned in discharging the lading into the bucket and repeating the hoisting and dumping operation as heretofore described. This operation is repeated as often as may be necessary to thoroughly clean the gutter and scraping the sides of it of manure and the like adhering thereto until the gutter is thoroughly cleaned. Of course, loose bedding, straw, manure, and the like can be removed from the frame floor onto the gutter or can be picked up with a scoop if lying in the stalls or the like. This apparatus can be used not only for cleaning the gutter but also for cleaning other portions of the concrete floor and the stalls as may be desired, the scoop being sufficiently light so that it can easily be manually operated.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claim.

What is claimed is:

In combination with a barn having a floor gutter therein and a discharge end, a drag line scoop adapted to fit into the gutter, a guiding handle on the said scoop, power operated means whereby the scoop is moved along the gutter in one direction, a bucket receiving pit at the discharge end of the gutter, a bucket in said pit, the wall of the bucket adjacent the discharge end of the gutter being of a lesser height than the discharge wall of the bucket, a drip plate at the discharge end of the gutter projecting over the edge of the bucket when the bucket is in the pit, inclined tracks on which the said bucket is mounted, hoisting means for the said bucket, a dump shaft and means on said bucket for engagement with the dump shaft whereby the contents of the bucket is discharged by the partial rotation of the bucket at a predetermined height, the bucket being angularly lowered into said pit and thereafter moved to a vertical position when seated in said pit whereby the upper edge of the wall of the bucket adjacent the discharge end of the gutter clears the drip plate as the bucket is positioned in the pit and hoisted out of the pit.

References Cited in the file of this patent

UNITED STATES PATENTS

| | | |
|---|---|---|
| 694,211 | Souhami | Feb. 25, 1902 |
| 1,699,175 | Yarn | Jan. 15, 1929 |
| 1,885,069 | Baker | Oct. 26, 1932 |
| 2,491,245 | Bergman | Dec. 13, 1949 |
| 2,639,803 | Tonagel et al. | May 26, 1953 |